United States Patent [19]

Berthet et al.

[11] Patent Number: 5,735,490
[45] Date of Patent: Apr. 7, 1998

[54] CONTROL DEVICE WITH A CONTROL STICK, PARTICULARLY A SERVO SIDESTICK FOR AIRCRAFT

[75] Inventors: Jean-Louis Berthet, Figeac; Eric Bondivenne, Decazeville, both of France

[73] Assignee: Ratier-Figeac, Figeac, France

[21] Appl. No.: 586,893

[22] PCT Filed: Jul. 20, 1994

[86] PCT No.: PCT/FR94/00908

§ 371 Date: Apr. 10, 1996

§ 102(e) Date: Apr. 10, 1996

[87] PCT Pub. No.: WO95/03566

PCT Pub. Date: Feb. 2, 1995

[30] Foreign Application Priority Data

Jul. 22, 1993 [FR] France .................. 93 09035

[51] Int. Cl.[6] ................... B64C 13/04; B64C 13/46
[52] U.S. Cl. ................... 244/223; 244/234; 244/236; 318/628
[58] Field of Search .................. 244/220, 221, 244/223, 234, 236; 318/628

[56] References Cited

U.S. PATENT DOCUMENTS

| | | |
|---|---|---|
| 2,475,484 | 7/1949 | Nise ........................ 244/223 X |
| 2,881,993 | 4/1959 | Browne ..................... 244/223 |
| 2,992,796 | 7/1961 | Wheldon .................. 244/223 X |
| 4,106,728 | 8/1978 | Griffith ..................... 244/223 |
| 4,500,967 | 2/1985 | Murphy et al. . | 
| 4,513,235 | 4/1985 | Acklam et al. ........... 244/223 X |
| 4,607,202 | 8/1986 | Koenig . | 
| 4,664,346 | 5/1987 | Koenig ..................... 244/223 |
| 4,947,070 | 8/1990 | Hill et al. ................ 244/223 X |
| 4,982,918 | 1/1991 | Kaye ........................ 244/223 |
| 5,059,882 | 10/1991 | Marcillat et al. . | 
| 5,264,768 | 11/1993 | Gregory et al. ......... 244/236 X |
| 5,291,113 | 3/1994 | Hegg et al. ............. 244/234 X |

FOREIGN PATENT DOCUMENTS

| | | |
|---|---|---|
| 0 179 209 | 4/1986 | European Pat. Off. . |
| 0 401 079 | 12/1990 | European Pat. Off. . |
| 483773 | 5/1992 | European Pat. Off. .......... 244/223 |

*Primary Examiner*—William Grant
*Attorney, Agent, or Firm*—Hoffmann & Baron, LLP

[57] ABSTRACT

A control device with a control stick, wherein the control stick is moved by an irreversible actuator controlled by a computer, and the computer controls the position of the actuator and thus the movement of the control stick, and slaves the control column position to the force applied, in accordance with force data, from a force sensor, and position data, from a position sensor, through use of a position vs. force law entered in the computer.

10 Claims, 1 Drawing Sheet

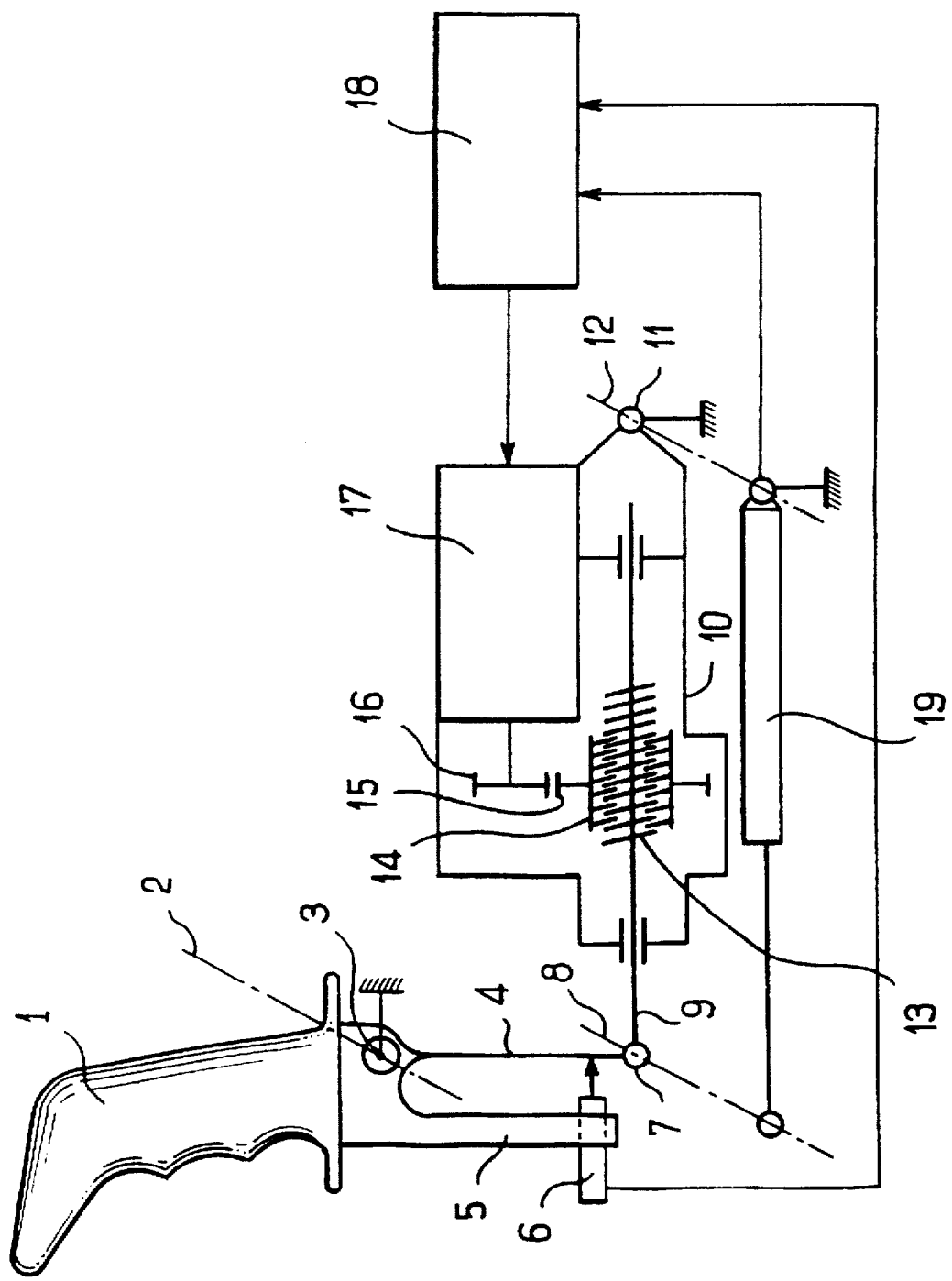

CONTROL DEVICE WITH A CONTROL STICK, PARTICULARLY A SERVO SIDESTICK FOR AIRCRAFT

BACKGROUND OF THE INVENTION

1. Field of the Invention

This invention relates to control devices having a control stick which moves with at least one degree of freedom, usually by translation along an axis, or even more commonly by pivoting about an axis of rotation. This displacement can be combined with other displacements along other axes, actuating other controls. It will be understood that the control stick may be an aircraft control stick, but may also be a manipulator for driving various vehicles, or a control lever for a machine or a game.

2. Description of the Prior Art

Generally speaking, electrical control has been substituted for the mechanical control performed by control sticks, and this has enabled mini-joysticks to be created by eliminating any mechanical transmission directly associated with the joystick.

Since the control is electrical, the mechanical reaction of the control mechanism and of the controlled members (for example, the rudder and ailerons of an aeroplane) is no longer felt by the user through the joystick. It has become apparent that it is worth reproducing an artificial feeling of mechanical reaction in the joystick.

Various mechanical return devices have been proposed, for example using springs. U.S. Pat. No. 5,059,882 to Marcillat et at. discloses a device in which the displacement of the joystick determines a reaction force by means of an electromechanical actuator controlled according to a predetermined force vs. position law.

SUMMARY OF THE INVENTION

The object of the invention is to provide a new control device which is applicable to control sticks in which control is effected by means of the displacement of the stick with at least one degree of freedom (such as pivoting or translation). In the present invention:

- the displacement (pivoting or translation) of the stick is produced by an irreversible actuator controlled by a computer;
- a force detector is provided both for measuring a force applied by a user to the stick, and for supplying force data to the computer;
- a position detector supplies to the computer a feedback of data representing the actual position of the stick; and
- the computer controls the operation of the actuator (and therefore the displacement of the stick) and servos the position of the actuator and of the stick as a function of the force and position data by means of a position vs. force law entered in the computer.

Since the actuator is irreversible, it resists movement of the stick due to the force applied by the user. The measurement of this force is transformed by the force detector into a suitable signal and is converted by the computer according to the predefined position vs. force law of the stick. This enables the actuator to be controlled so as to displace the stick to a position which will correspond to the force applied.

It is clear that the successive stages into which the operation is split in fact occur in quick succession. Thus, the user has the impression that the stick is moving with the force, and reacting with a reaction force, similarly to a visco-elastic system.

As used herein, "position detector" refers to means for supplying data which is representative of the position of the stick. The position detector need not necessarily be a specific component; in particular, it can be integrated into the drive mechanism before the stick.

The above-referenced position detector, or another independent detector, can be used to output a control signal.

The measurement of the force applied to the stick can also be used to control the steering of the vehicle or the machine. In this way, even if the actuator were unable to operate for any reason, and the stick stayed jammed in some position, steering would still be possible by simply varying the force applied to the stick.

It will be understood that the invention can be applied to servo control of movement in two axes of rotation, or in more than one axis of translation, and not just a single one. The axes can be de-coupled and independent, and the servo feedbacks can be different.

Preferably the measurement of the force applied to the stick is made by measurement of deformation or displacement of a deformable elastic device which is interposed between the stick and the actuator. The elastic device can be a leaf spring. For example, the leaf spring may be fixed to the stick at one end and may be connected to the actuator at the other end through a hinged joint.

The measurement of the force by means of the deformation of the leaf spring enables bigger displacements (of the order of $10^{-2}$ to 1 mm) to be sensed than those measured by other systems of force detectors, such as strain gauges (microscopic movements of the order of $10^{-5}$ to $10^{-3}$ mm). The corresponding movements of the joystick remain sufficiently small (less than 1 degree) so as not to spoil the physiological impression that the user has at the grip.

This means that measurement of the displacements can be made by using linear or rotary, inductive or resistive detectors whose reliability, accuracy and stability as a function of time, of temperature and environmental conditions are much better than for detectors of the extensometer or piezo-electric kinds. Operating safety is therefore considerably improved.

The principle of measurement of the force applied to a control stick is known per se, of course, for example from U.S. Pat. No. 4,607,202 to Koenig. However in that case the control stick is mechanical and not electrical, and the measurement of force is intended to compensate for the influence introduced by acceleration acting on inertial masses, and not to provide a servo control of the position of the stick by means of an irreversible actuator.

The detector is disposed rigidly fixed to the actuator or to the stick itself. For example, the detector can be located on an extension which is parallel to the leaf spring. The feedback of the position is preferably arranged in such a way as not to be influenced by the elastic deformation of the force detector.

The irreversible electromechanical actuator may be a linear screw jack, whose body and plunger are hinged respectively to the chassis of the device and to the stick.

The position of the stick can be controlled by the computer by means of the stick position detector, for example, placed in parallel on the actuator or integrated into the actuator.

It will be understood that it is possible to provide redundant measurement and calculation systems in order to improve safety further.

Moreover, means may advantageously be introduced for varying the position vs. force law in the parameters of the computer, so as to enable the law to be adapted to the ergonomics of the control, as well as to enable its real time modification as a function of the configuration of the systems controlled.

Other features and advantages of the invention will appear from the following description of an embodiment thereof, which is an example of the case where a control system has a single rotational axis.

BRIEF DESCRIPTION OF THE DRAWINGS

Reference will be made to the single figure of the accompanying drawings which is a diagrammatic view of the system.

DETAILED DESCRIPTION OF THE PREFERRED EMBODIMENTS

The mini joystick 1 pivots in a plane about a transverse axis of rotation 2 on a pivot 3 which is indicated merely diagrammatically in the drawing. It will be understood that the case of rotation about a single axis is considered herein with the provision of a servo control for this movement; the mini joystick 1 may also pivot about a second axis orthogonal to the axis 2 by means of a second pivot (not shown), which may be interposed between the mini joystick 1 and the pivot 3, for example.

A first extension consisting of a leaf spring 4, and a second, rigid, extension 5 are secured to the mini joystick 1 to follow its main pivoting movement and preferably extend orthogonally to the axis of rotation. The second extension 5 extends parallel to the first extension 4 and provides support for a displacement detector 6. The displacement detector can be, for example, a sensor acting with or without contact, enabling the relative displacement between the leaf spring 4 and the rigid extension 5 to be measured.

The end of the leaf spring 4 is connected to the end of the plunger 9 of a linear screw jack 10 by means of a hinge 7 which enables it to pivot about an axis 8 which is parallel to the axis of rotation 2.

The body of the jack 10 is itself hinged about an axis of rotation 12 parallel to the axis of rotation 2 at its rear end 11, fixed relative to the chassis. The chassis, not separately numbered, is indicated diagrammatically by the well-known symbols for built-in fixity adjacent the pivot points.

The plunger 9 slides in the body of the jack 10 and is driven by means of the cooperation of screw threads 13 and 14 and of gear wheels 15 and 16. Gear wheels 15 and 16 are drivingly connected to a motor 17.

The motor 17 is controlled by a digital or analogue computer 18.

A position detector 19 is mounted in parallel between the hinges 7 and 11 of the jack, and may of course be integrated with the jack 10. The position detector measures the effective absolute position of the end of the leaf spring 4, which is representative of the effective absolute position of the grip 1 relative to the chassis. Noise scatter is, however, eliminated from the measurement, since in this arrangement the detector responds to the end of the leaf spring and not directly to the grip. Both the position detector 19 and the displacement detector 6 output position data to the computer 18, whose function is to derive the displacement commands.

The operation of the device is as follows.

The user applies a force to the grip 1.

On account of the irreversibility of the jack 10, the end of the leaf spring 4 resists this force, which therefore causes a (small) deformation of the elastic device which is formed by the leaf spring 4. This deformation is measured by the displacement detector 6 and transmitted to the computer 18 which interprets it in terms of force.

The computer 18 derives and feeds back a position command which is transmitted to the motor 17. The command is dependent on the position vs. force law which is entered into the computer.

The jack 10 therefore produces a displacement of the plunger 9 in accordance with this law and with the dynamic parameters stored in the computer memory: accelerations, viscosity, dry friction, thresholds, etc.

The position detector 19 completes the feedback loop for the position of the plunger 9 through the computer 18 and the position vs. force law.

This displacement does not cause any change in the deformation of the leaf spring 4, nor the rigid extension 5. Since this deformation only depends on the force applied by the user, which only varies at the user's initiative.

Any modification of the force applied by the user or of the position vs. force law results instantaneously in movement of grip 1.

We claim:

1. A control device comprising:
   (a) a control stick which is displaceable in at least one degree of freedom and which has a user-applied force applied thereto by a user;
   (b) means for reproducing, at said control stick, a feeling of a reacting force which reacts against the user-applied force;
   (c) a computer;
   (d) an irreversible actuator which is coupled to said control stick and which controls displacement of said control stick, said irreversible actuator in turn being coupled to said computer, said control stick being displaceable by said irreversible actuator but said irreversible actuator not being displaceable by the user applied force applied to said control stick;
   (e) a force detector which is associated with said control stick and which measures the user-applied force and supplies user-applied force data, indicative of the user-applied force, to said computer; and
   (f) a position detector which is associated with said control stick and which supplies said computer with a feedback of actual position of said control stick;
   wherein:
   said computer controls operation of said irreversible actuator and thus the displacement of said stick; and
   said computer servos the position of said control stick to the user-applied force, as a function of the user-applied force data and the actual position of said control stick, via a position versus force law entered in said computer.

2. The device of claim 1, wherein said force detector comprises a deformable elastic device inserted between said control stick and said irreversible actuator, deformation of said elastic device being measured as representative of the user-applied force.

3. The device of claim 2, wherein said elastic device is a leaf spring secured for movement with said control stick, said leaf spring having a free end connected to said irreversible actuator by a hinged joint.

4. The device of claim 3, further comprising a displacement detector which detects deformation of said leaf spring and which is rigidly fixed for movement with one of said control stick and said irreversible actuator.

5. The device of claim 1, wherein said irreversible actuator is a screw jack.

6. The device of claim 5, wherein said screw jack comprises a body and a plunger and wherein said device further comprises a chassis, said body of said screw jack being hinged on said chassis about a first axis of rotation, said plunger of said screw jack being hinged on said stick about a second axis of rotation parallel to said first axis of rotation.

7. The device of claim 1, wherein said position detector is used to output a control signal.

8. The device of claim 7, wherein said position detector is disposed in parallel with said irreversible actuator.

9. The device of claim 1, wherein said control stick is displaceable in said at least one degree of freedom in a pivoting movement.

10. The device of claim 1, wherein measurement of said user-applied force is employed as a control signal via said position versus force law, with said control stick immobilized in any given position.

* * * * *